United States Patent
Sami et al.

(10) Patent No.: US 6,889,317 B2
(45) Date of Patent: May 3, 2005

(54) PROCESSOR ARCHITECTURE

(75) Inventors: Mariagiovanna Sami, Milan (IT); Donatella Sciuto, Milan (IT); Cristina Silvano, Milan (IT); Vittorio Zaccaria, Milan (IT); Danilo Pau, Sesto San Giovanni (IT); Roberto Zafalon, Venice (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 567 days.

(21) Appl. No.: 09/976,241

(22) Filed: Oct. 11, 2001

(65) Prior Publication Data
US 2002/0124155 A1 Sep. 5, 2002

(30) Foreign Application Priority Data
Oct. 17, 2000 (EP) .............................. 00830673

(51) Int. Cl.[7] ................................ G06F 9/38
(52) U.S. Cl. ......................................... 712/218
(58) Field of Search ..................... 712/23, 24, 244, 712/225, 218

(56) References Cited
U.S. PATENT DOCUMENTS

| | | | |
|---|---|---|---|
| 4,228,497 A | | 10/1980 | Gupta et al. ............... 364/200 |
| 5,784,320 A | * | 7/1998 | Johnson ................. 365/189.01 |
| 5,799,165 A | * | 8/1998 | Favor et al. ................. 712/214 |
| 5,809,325 A | * | 9/1998 | Hinton et al. ................. 712/32 |
| 6,247,134 B1 | * | 6/2001 | Sproch et al. .............. 713/320 |
| 6,633,971 B2 | * | 10/2003 | Peng et al. ................. 712/218 |
| 6,738,966 B1 | * | 5/2004 | Tanaka ....................... 717/140 |

FOREIGN PATENT DOCUMENTS

EP 0 569 312 A2 11/1993

OTHER PUBLICATIONS

Lozano, L. et al., "Exploiting Short–Lived Variables in Superscalar Processors", pp. 292–302, XP000585373, Nov. 29, 1995.
Liebchen, A. et al., "Dynamic Reordering of High Latency Transactions Using a Modified Micropipline", pp. 336–340, XP000344638, Oct. 11, 1992.

* cited by examiner

*Primary Examiner*—Eric Coleman
(74) *Attorney, Agent, or Firm*—Lisa K. Jorgenson; Robert Iannucci; Seed IP Law Group PLLC

(57) ABSTRACT

An architecture for a pipeline processor circuit, preferably of the VLIW type, comprises a plurality of stages and a network of forwarding paths which connect pairs of said stages, as well as a register file for operand write-back. An optimization-of-power-consumption function is provided via inhibition of writing and subsequent readings in said register file of operands retrievable from said forwarding network on account of their reduced liveness length.

58 Claims, 4 Drawing Sheets

PROCESSOR ARCHITECTURE

BACKGROUND OF THE INVENTION

1. Field of the Invention

The present invention relates to processor architectures, in particular of the type currently referred to as "pipeline" architectures.

2. Description of the Related Art

One of the main effects of the introduction of the pipelining technique is the modification of the relative timing of instructions resulting from the overlapping of their execution, which introduces factors of conflict or hazard due both to data dependence (data hazards) and to modifications of the control stream (control hazards). In particular, such conflicts emerge when sending of instructions through the pipeline modifies the order of read/write accesses to operands with respect to the natural order of the program (i.e., with respect to the sequential execution of instructions in non-pipelined processors).

In this connection, useful reference may be made to J. Hennessy and D. A. Patterson, "Computer Architecture: A Quantitative Approach," Morgan Kaufmann Publishers, San Mateo, Calif., Second Edition, 1996.

The set of problems linked in particular to data hazards may be solved at a hardware level with the technique currently referred to as "forwarding" (or also "bypassing," and sometimes "short-circuiting"). This technique uses the interstage registers of the pipeline architecture for forwarding the results of an instruction Ii, produced by one stage of the pipeline, directly to the inputs of the previous stages of the pipeline in order to be used in the execution of instructions that follow Ii. A result may therefore be forwarded from the output of one functional unit to the inputs of another unit that precedes it in the flow along the pipeline, and likewise starting from the output of one unit to the inputs of the same unit.

In order to ensure this forwarding mechanism, it is necessary to provide, in the processor, the required forwarding paths and the control of these paths. The forwarding technique may require a specific path starting from any register of the pipeline structure to the inputs of any functional unit, as in the case of the architecture known as "DLX," to which reference is made in the text cited previously.

Data bypassed to the functional units of the early pipeline stages are normally in any case stored in the register file (RF) during the last pipeline stage (i.e., the so-called "writeback stage") in view of a subsequent use in the program being executed. Processors that use the forwarding technique achieve substantial improvements in terms of performance owing to the elimination of stall cycles introduced by data-hazard factors.

The main problems linked to the forwarding mechanism in the sphere of processors, and in particular in the sphere of the so-called "very-long-instruction-word or VLIW processors" have been investigated in studies, such as A. Abnous and N. Bagherzadeh, "Pipelining and Bypassing in a VLIW Processor," IEEE Trans. on Parallel and Distributed Systems, Vol. 5, No. 6, June 1994, pp. 658–663, and H. Corporaal, "Microprocessor Architectures from VLIW to TTA," John Wiley and Sons, England.

The above works analyze the advantages in terms of performance of various bypassing schemes, in particular as regards their effectiveness in solving data hazards in both four-stage and five-stage pipeline architectures.

The idea of exploiting register values that are bypassed during pipeline stages has been combined with the introduction of a small register cache with the purpose of improving performance, as is described in the work by R. Yung and N. C. Wilhelm, "Caching Processor General Registers," ICCD '95. Proceedings of IEEE International Conference on Computer Design, 1995, pp. 307–312. In this architecture, referred to as "Register Scoreboard and Cache," pipeline operands are supplied either by the register cache or by the bypass network.

In the work by L. A. Lozano and G. R. Gao, "Exploiting Short-lived Variables in Superscalar Processors," MICRO-28, Proceedings of 28th Annual IEEE/ACM International Symposium on Microarchitecture, 1995, pp. 292–302, a scheme is proposed for superscalar processors which comprises an analysis carried out by the compiler and an extension of the architecture in order to avoid definitive writings in the RF (commits) of the values of variables which are bound to be short-lived and which, consequently, do not require long-term persistence in the RF. The advantages provided by this solution have been assessed by the authors prevalently in terms of reduction of the write ports to the RF and of reduction in the amount of transfers from registers to memory required, so as to achieve improvements in execution time. The work referred to reports the improvements linked to this solution in terms of performance, without any consideration, however, of the effects in terms of power absorption.

The concept of avoiding the presence of information without any useful value (dead-value information) in the RF is analyzed in the work by M. M. Martin, A. Roth, and C. N. Fischer, "Exploiting Dead Value Information," MICRO-30, Proceedings of 30th Annual IEEE/ACM International Symposium on Microarchitecture, 1997, pp. 125–135. The values in the registers are considered useless or "dead" when they are not read before being overwritten. The advantages of this solution have been studied in terms of reduction in RF size and elimination of unnecessary save/restore instructions from the execution stream at procedure calls and across context switches.

As has been shown in works, such as A. Chandrakasan and R. Brodersen, "Minimizing Power Consumption in Digital CMOS Circuits," Proc. of IEEE, 83(4), pp. 498–523, 1995, and K. Roy and S. C. Prasad, "Low-power CMOS VLSI Circuit Design," John Wiley and Sons, Inc., Wiley-Interscience, 2000, a reduced power absorption constitutes an increasingly important requirement for processors of the embedded type. Low-power-absorption techniques are widely used in the design of microprocessors in order to meet the stringent constraints in terms of maximum power absorption and operating reliability, whilst maintaining unaltered the characteristics in terms of processing speed.

The majority of low-power-absorption techniques developed for digital CMOS circuits aim at reducing switching power, which represents the most significant contribution to the global power budget. For high-performance processors, low-power-absorption solutions aim at reducing the effective capacitance $C_{EFF}$ of the processor nodes being switched.

The parameter $C_{EFF}$ of a node is defined as the product of the load capacitance $C_L$ and the switching activity $\alpha$ of the node. In digital CMOS processors it is possible to obtain considerable economy in terms of power absorption by minimizing the transition activity of high-capacitance buses, such as data-path buses and input/output buses. Another significant component of the power budget in modem processors is represented by multi-port RF accesses and other on-chip cache accesses.

SUMMARY OF THE INVENTION

An embodiment of the present invention provides a processor architecture that is able to overcome the drawbacks and limitations outlined previously.

In particular, the architecture is optimized for static-scheduling pipelined processors, and in particular for VLIW-architecture pipelined processors capable of exploiting the data-forwarding technique in regard to short-lived variables, in order to cut down on power absorption.

Basically, the architecture reduces the RF-access activity by avoiding long-term storage of short-lived variables. This is possible—with a negligible overhead in hardware terms—thanks to the pre-existing availability of interstage registers and of appropriate forwarding paths. Short-lived variables are simply stored locally by the instruction that produces them in the interstage registers and are forwarded directly to the appropriate stage of the instruction that uses them, exploiting the forwarding paths. The instruction that produces the variables does not therefore carry out a costly action of write-back to the RF, and, in turn, the instruction that uses the variables does not have to perform any read operation from the RF.

The application of this technique entails evaluation of the liveness length L of the n-th assignment to a register R, defined as the distance between its n-th assignment and its last use. This information makes it possible to decide whether the variable is to be stored in the RF in view of a subsequent use, or whether its use is in fact limited to just a few clock cycles. In the latter case, the variable is short-lived, and its value may be passed on as an operand to the subsequent instructions, by using the forwarding paths, thus avoiding the need to write it in the RF.

The decision whether to enable the RF write phase may be taken by the hardware during execution, or else anticipated during compiling of the source program. Unlike what occurs in superscalar processors, where the majority of the decisions are taken by the hardware at the moment of execution, the application of the low-power-absorption bypass technique in VLIW architectures may be performed during static scheduling by the compiler. This procedural approach reduces the complexity of the processor control logic.

The proposed architecture becomes particularly attractive in the case of certain applications of the embedded type whereby the analysis of register liveness length has shown that the interval of re-use of more than half of all the register definitions is limited to the next two instructions.

Some important characteristics of the architecture are the following:

- the architecture proposes an extension of an architectural type of the processor bypass network so as to prevent writing and subsequent reading of short-lived variables to/from the RF;
- it is possible to analyze the effects on the compiler of the low-power-absorption architecture solution proposed for VLIW processors, by showing the possible implementation to keep the hardware limited;
- it is possible to handle exceptions (e.g., error traps, division by zero, etc.);
- the architecture may be extended also to processors with more than five pipeline stages (comprising more than three forwarding paths) so as to cut down on power absorption for variables the liveness length of which is greater than three;
- the architecture opens up the road to further economies in terms of power absorption, which may be obtained by an optimization of instruction scheduling, exploiting to the full the intrinsic parallelism of such processors and aiming at minimizing the "mean life" (liveness length) of the variables.

BRIEF DESCRIPTION OF THE DRAWINGS

The invention will now be described, purely to provide a non-limiting example, with reference to the attached drawings, in which.

DETAILED DESCRIPTION OF THE INVENTION

Figure 1:
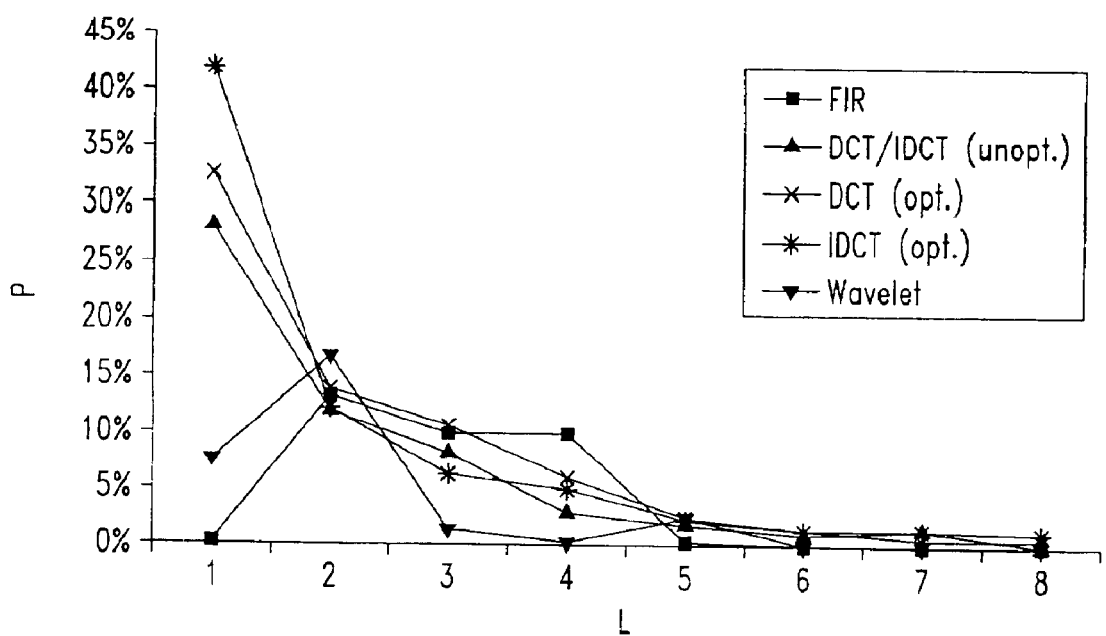
FIG. 1 is a diagram illustrating the results of an analysis conducted on the active life of the registers in a processor framework.

Before proceeding to a detailed description of an embodiment of the invention, it is useful to refer, in what follows, to the results of a number of experimental analyses conducted for establishing the liveness length of variables in embedded-type applications.

The specific purpose was to measure—in the execution phase—the percentage of register definitions in the application code that can be read directly by the forwarding network without being written in the RF.

The analysis referred to above was conducted employing, as an example, a set of currently used DSP algorithms written in C language and compiled using a 32-bit 4-way industrial VLIW compiler.

The register liveness-length analysis may be performed either statically or dynamically.

Static analysis consists in inspecting, in a static way, the assembler code generated by the compiler in the context of each basic block, so as to detect the liveness length of the registers.

Dynamic analysis consists in inspecting the execution traces of the assembler code, a procedure that provides more accurate profiling information as regards register read/write accesses.

The results reported in what follows relate to the dynamic solution.

Each benchmark program was appropriately instrumented at the assembler level with an automatic tool and then simulated, so as to keep track of the relevant information at each clock cycle, namely:

register definitions;
register uses; and
basic-block boundaries encountered.

For each basic block in the trace, analysis of register liveness length was performed by defining the liveness length L of the n-th assignment to a register R as the distance (expressed in number of instructions) between the n-th assignment and its last use:

$$L_n(R) = U_n(R) - D_n(R),$$

where $D_n(R)$ is the trace index of the instruction that made the n-th assignment to R, and $U_n(R)$ is the index of the last instruction that used the n-th assignment to R prior to redefinition of R during the (n+1)-th assignment $D_{n+1}(R)$.

In a VLIW architecture it is possible to assume a throughput of one very long instruction per clock cycle.

In order to maintain the analysis extremely conservative, the computation of $L_n(R)$ was performed applying the following restrictions:

$U_n$ and $D_n$ are in the same basic block; and $D_{n+1}$ and $D_n$ are in the same basic block.

These rules enable a simplification of the analysis by considering only liveness ranges that do not transcend the boundaries between the basic blocks. However, this assumption does not constitute an important limitation, given that the majority of modem VLIW compilers maximize the size of basic blocks, so generating a relevant number of liveness ranges that are resolved completely within the respective basic block.

To clarify the above concept, we can analyze an assembler-code trace for a 4-way VLIW machine which executes a discrete-cosine-transform (DCT) algorithm. The code analyzed is made up of four very long instructions (namely, 27268, 27269, 27270, and 27271):

| 27268 | shr | $r16 = $r16, 8 |
| | sub | $r18 = $r18, $r7 |
| | add | $r17 = $r17, $r19 |
| | sub | $r19 = $r19, $r15; |
| 27269 | shr | $r18 = $r18, 8 |
| | shr | $r17 = $r17, 8 |
| | shr | $r19 = $r19, 8 |
| | mul | $r20 = $r20, 181; |
| 27270 | shr | $r10 = $r10, $r8 |
| | mul | $r11 = $r11, 3784 |
| | sub | $r5 = $r12, $r9; |
| 27271 | sub | $r10 = $r10, $r3 |
| | add | $r20 = $r20, 128 |
| | brf | $r26, label__232; | in which each very long instruction is identified by an execution index, by a set comprising from one to four operations, and terminates with a semicolon.

In the above example, a boundary may be noted which concludes a basic block at the instruction 27271 (the conditional-branch operation).

If we consider the liveness of the assignment of the register $r18 in 27268 ($D_n$), it may seen that this definition is used for the last time in 27269, given that there is another definition of the register $r18 in the same cycle (namely, $D_{n+1}$). The value of $L_n$ of $r18 is therefore equal to one clock cycle. It should be noted that it is not possible to compute the value $L_{n+1}$ of $r18, since there are neither last uses $U_{n+1}$ nor redefinitions $D_{n+2}$ in the same basic block.

For the purposes of the analysis, a set of test programs (benchmark set) was selected made up of the following algorithms:

a finite-impulse-response (FIR) filter;

a sample program performing a discrete cosine transform (DCT) and an inverse discrete cosine transform (IDCT);

an optimized DCT;

an optimized IDCT; and a wavelet transform.

Note that, in order to improve performance, the optimized versions of the DCT/IDCT algorithms are characterized by a lower number of accesses to memory and a higher re-use of the registers as compared to the other algorithms.

The distribution of the register-liveness values detected by the algorithms considered is given in Table 1 below and is summarized graphically in FIG. 1 of the attached drawings.

| | Register Liveness Length (in clock cycles) | | | | | | | |
|---|---|---|---|---|---|---|---|---|
| Algorithm | 1 | 2 | 3 | 4 | 5 | 6 | 7 | 8 |
| FIR | 0% | 13% | 10% | 10% | 0% | 0% | 0% | 0% |
| DCT/IDCT | 28% | 12% | 8% | 3% | 2% | 1% | 1% | 0% |
| DCT (opt.) | 32% | 14% | 11% | 6% | 2% | 1% | 0% | 0% |
| IDCT (opt.) | 42% | 12% | 6% | 5% | 2% | 1% | 1% | 1% |
| Wavelet | 7% | 17% | 1% | 0% | 2% | 0% | 0% | 0% |

In the above table, the columns represent the percentage of the registers the liveness of which is equal to a given value L lying in the range from 1 to 8 clock cycles (instructions).

In FIG. 1 of the attached drawings, given on the ordinate are the above percentage values as a function of the values of L appearing on the abscissa.

Both from Table 1 and from FIG. 1 it emerges that—albeit with simplifying hypotheses—for the optimized algorithms, approximately one half of all the register definitions have liveness values of not greater than two clock cycles (46% and 54% for the DCT algorithm and the IDCT algorithm, respectively). On average, in 35.4% of the cases the distance between the definition of the register and its last use is less than or equal to two clock cycles, whereas in 42.6% the distance is less than or equal to three clock cycles.

The above analysis moreover does not take into account the case where a register is never read between two successive definitions. In actual fact, there may be an overwriting of the register, for instance across basic blocks or during processor context switches (e.g., in response to an external interruption), but this phenomenon cannot be estimated in a static way at compiling in the framework of a basic block. Albeit advantageous for the solution according to the invention, the phenomenon is, however, not relevant for the current analysis, which focuses on an optimization function applicable in the framework of a basic block during the VLIW static compiling phase.

Figure 2:
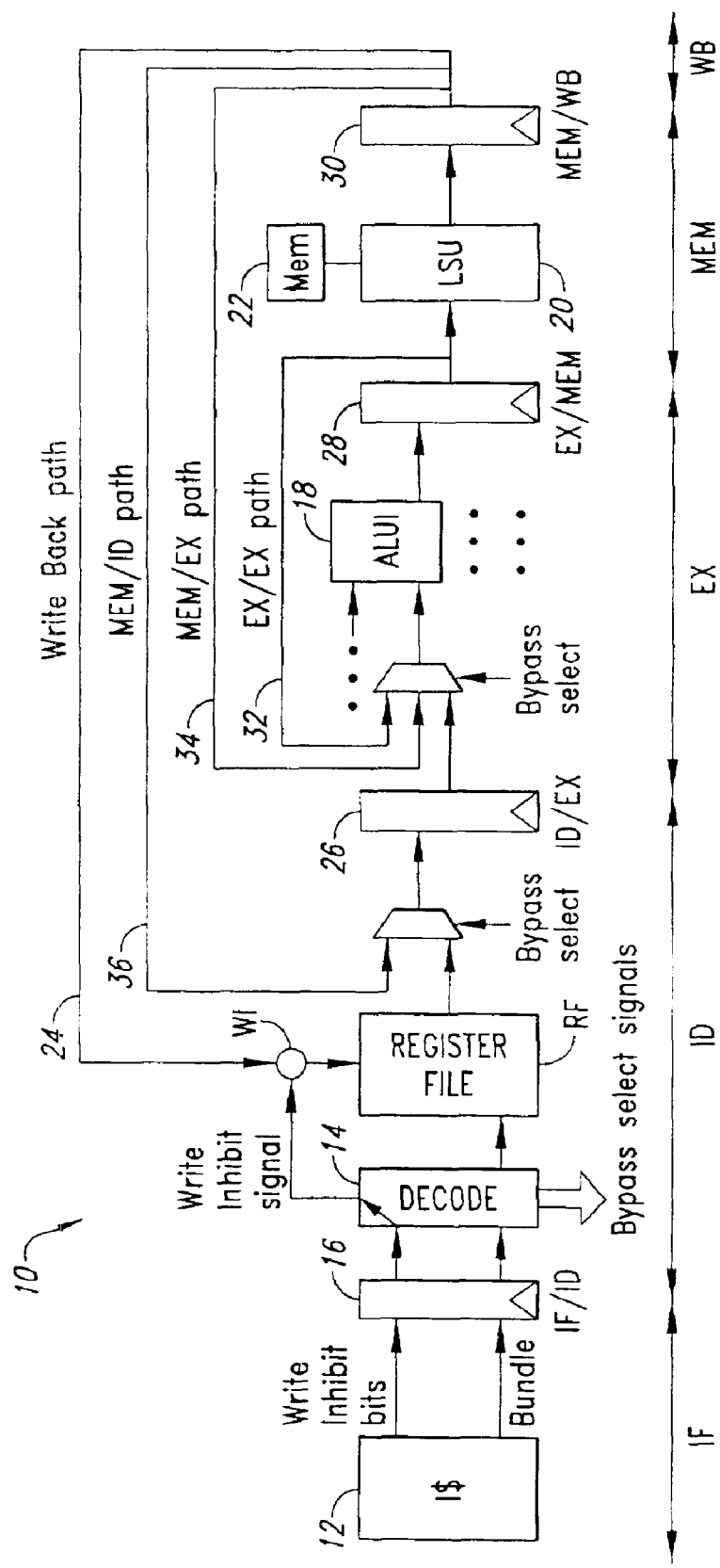
FIG. 2 illustrates, in the form of a functional block diagram, the application of an architecture according to the invention in a processor framework.

Purely to provide a non-limiting example, the diagram of FIG. 2 refers to a 4-way VLIW processor architecture 10 with a 5-stage pipeline provided with forwarding logic.

The pipeline stages are the following:

IF: instruction fetch from an instruction cache (I$)12;

ID: instruction decoding and operand reading from the RF using a decoder 14 that is coupled to the instruction cache 12 by a first interstage register 16;

EX: execution of instructions in arithmetic logic units (ALUs) 18 having a latency corresponding to one clock cycle;

MEM: accesses to memory for load/store instructions by a load/store unit 20 coupled to a memory 22; and WB: write-back of operands in the RF using a write back path 24.

A second interstage register 26 couples the register file RF to the ALUs 16, a third interstage register 28 couples the ALUs 18 to the load/store unit 20, and a fourth interstage register 30 couples the load/store unit 20 back to the register file RF. Three forwarding paths (EX—EX 32, MEM-EX 34, and MEM-ID 36) provide direct connections between pairs of stages through the EX/MEN and MEM/WB interstage registers 26, 28. The MEM (ID path) 36 is coupled to the second interstage register 24 by a first bypass MUX 38 and the forwarding paths 32, 34 are coupled to the ALUs 18 by a second bypass MUX 40.

The various symbols and designations given in FIG. 2 are well known to persons skilled in the sector, and consequently do not call for a detailed description herein. This applies both in regard to their meaning and in regard to their function.

The architecture in question is applicable, for example, in embedded VLIW cores of the Lx family, jointly developed by Hewlett-Packard Laboratories and by the present applicant. Each cluster of the Lx family comprises four ALUs for 32-bit integer operands, two 16×32 multipliers, and one load/store unit. The RF comprises sixty-four 32-bit general-purpose registers and eight 1-bit branching registers.

With reference to the aforementioned forwarding network, consider a sequence $W = w_1 \ldots w_2 \ldots w_n$ of very long instructions. A generic instruction $w_k$ can read its operands from the following instructions:

$w_{k-1}$ through the EX/EX forwarding path 32 (used when $w_k$ is in the EX stage);

$W_{k-2}$ through the MEM/EX forwarding path 34 (used when $w_k$ is in the EX stage);

$W_{k-3}$ through the MEM/ID forwarding path 36 (used when $w_k$ is in the ID stage);

$w_{k-n}$ when n>3 through the RF.

As indicated, the architecture inhibits the writing and subsequent readings of the operands in the RF whenever the values written may be retrieved from the bypass network on account of their short liveness.

This occurs specifically through the Write-Inhibit signal which is generated selectively in the ID stage and is destined to act on a WI node interposed in the path of the Write-Back signal from the WB stage to the RF.

Assuming, for example, that an instruction $w_d$ assigns a register R, the liveness length of which is less than or equal to 3, and that $w_k$ uses R during this live interval, the basic idea is to reduce power absorption by:

disabling writing of R in the WB stage of $w_d$; and inhibiting $W_k$ from asserting the RF read address to read R (retrieved from the bypass network).

In general, whereas avoidance of write-back must be explicitly indicated in the very long instruction $w_d$, the information regarding the need for the source operands to be derived from the forwarding paths is in any case made available by the control logic, whatever the liveness of the variable might be. Consequently, it is possible to avoid reading from the RF whenever the source operands are expected to be extracted from the forwarding paths.

The power-absorption optimization function described above is implemented by a dedicated logic in the ID stage which disables the write-enable signals for writing in the RF and minimizes RF read-port switching activity by maintaining the input read addresses equal to those of the last useful-access cycle.

As a practical example, reference may be made to the sequence of instructions considered previously, and in particular to the instructions 27268 and 27269. Writing-back of the registers $r18,$r17 and $r19 in the RF during execution of 27268 may be avoided, and the subsequent reading of these values during execution of 27269 may be carried out directly from the EX—EX path of the bypassing network.

In a superscalar processor, this behavior should be controlled by hardware, analyzing the instruction window to compute register liveness and generate control signals to the pipeline stages.

In a VLIW architecture, all scheduling decisions concerning data, resources and control are solved during compiling in the code-scheduling phase, as described, for example, in A. V. Aho, R. Sethi, and J. D. Ullman, "Compilers: Principles, Techniques, and Tools," Addison-Wesley, 1986.

Consequently, the decision as to whether the destination register must be write-inhibited or not can be delegated to the compiler, thus limiting the hardware overhead.

To pass the information from the compiler to the hardware control logic, two different approaches may be adopted:

reserving specific operation bits in the encoding of the very-long-instruction format; this is suitable during definition of the instruction set, but it may entail a slight increase in instruction-encoding length;

exploiting unused instruction-encoding bits; this solution is suitable when the instruction set has already been defined: it affords the possibility of saving on instruction length, but at the possible expense of limiting power saving to a subset of the operations present in the instruction set.

In either case, whilst the RF switching activity is minimized, there is a slight increase in the switching activity of the memory units used to store instructions.

As far as the problem of exception handling is concerned, the state of the processor may be assumed as being one of the following:

a permanent architectural state stored in the RF;

a volatile architectural state stored in the pipeline inter-stage registers from which the forwarding network transfers the source operands.

The volatile architectural state is handled as a FIFO memory having a depth equal to the number of stages during which the result of an operation can be stored in the pipeline (in the case of the 5-stage pipeline architecture represented in FIG. 2, this depth is equal to three).

In general, a pipelined processor ensures that, when an element exits the volatile state, it is automatically written-back in the RF.

Instead, in the solution described herein, when an element exits the volatile state and is no longer used, it can be discarded, so avoiding write-back in the RF. This behavior can create some problems when an exception occurs during processing.

In the architecture proposed herein as a reference example, an exception may occur in particular during the ID, EX or MEM stages, and can be serviced in the WB stage.

According to the exception taxonomy defined in the work by H. Corporaal cited previously, it is assumed that the processor adopts the operating mode currently referred to as "user-recoverable precise mode."

According to this model, the exceptions may be either exact or inexact.

An exact exception caused by an instruction issued at time t is a precise exception such as to require that the state changes caused by handling the exception should be visible to all instructions issued at and after time t and to none of the instructions issued before. Furthermore, all state changes in instructions issued before time t are visible to the exception-handling function.

If it is assumed that exceptions are handled in exact mode, when the excepting instruction reaches the WB stage, the instructions in the pipeline are flushed and re-executed.

Figure 3:
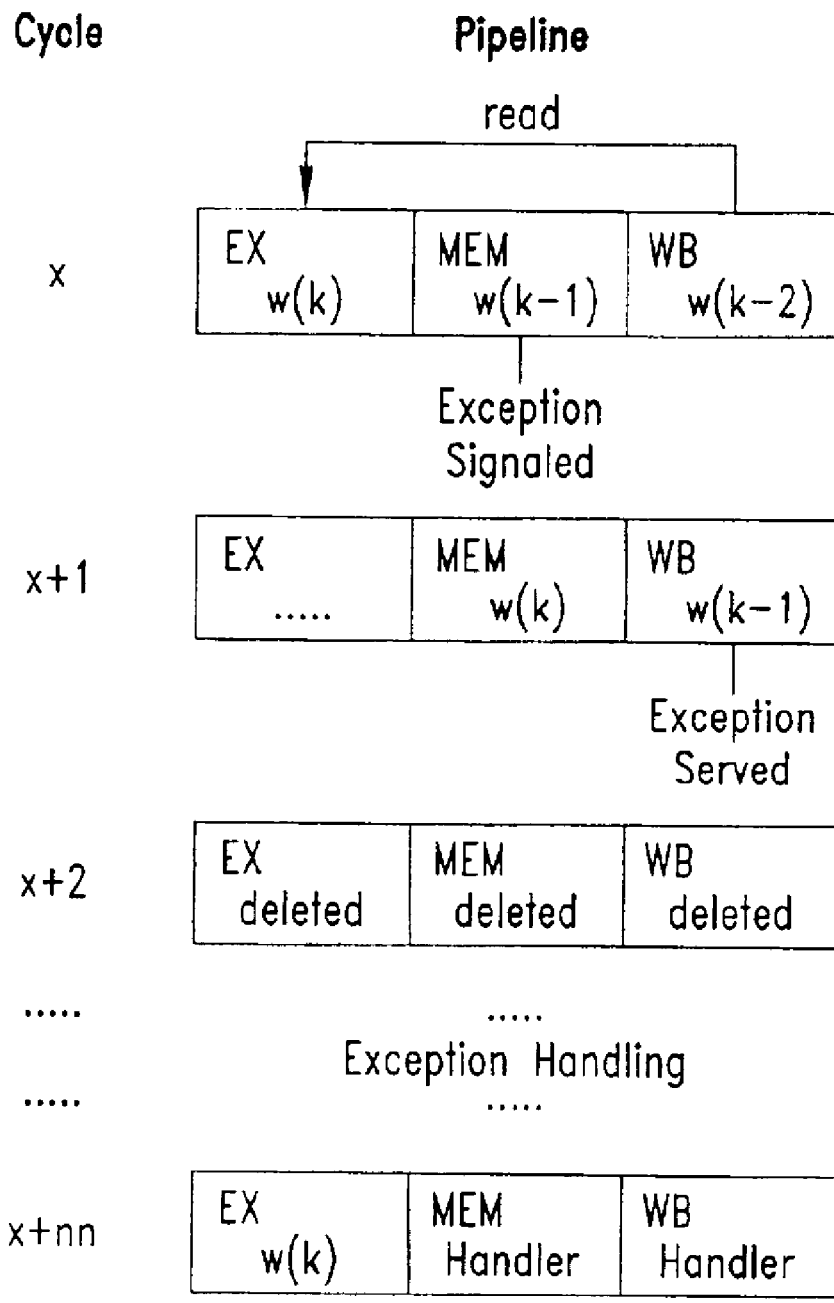
FIG. 3 is a diagram illustrating the modalities with which exceptions are handled in a processor framework, in accordance with the invention.

Consider the situation illustrated in FIG. 3, where at cycle x an instruction $w_k$ reads its values from a write-inhibited instruction $w_{k-2}$ through the forwarding network. At the same time assume that the instruction $W_{k-1}$ generates an exception during the MEM stage. The results of $W_{K-2}$ would be lost, but it is necessary for these values to be used during re-execution of $W_k$. Since neither the forwarding network nor the RF contain the results of $W_{K-2}$, the architectural state seen during the re-execution of $W_k$ (at cycle x+nn) would be incorrect.

In order to guarantee that the instructions in the pipeline are re-executed in the correct processor state, the write-inhibited values must be written in the RF whenever an exception signal is generated in the ID, EX or MEM stages.

In the case of the previous example, namely with $w_{K-1}$ generating an exception in the MEM stage, the solution here described forces write-back of the results of $w_{K-1}$ and $w_{K-2}$ in the RF, so that during re-execution of $W_k$ at cycle x+nn the operands are read from the RF.

If, instead, it is assumed that exceptions are handled in non-exact or "inexact mode," when an exception occurs the instructions present in the pipeline are executed until completion, without the effects of the exception that is serviced subsequently being seen. In this case, all instructions in the pipeline are forced to write back the results in the RF.

The architecture represented in FIG. 2 is able to guarantee both of the exception-handling mechanisms described previously.

When the exceptions are handled in exact mode, the supported register liveness is less than or equal to two clock cycles (through the EX/EX and MEM/EX paths).

When the exceptions are handled in non-exact mode, the exploiting register liveness can be extended to three clock cycles (through the EX/EX, MEM/EX and MEM/ID paths).

With specific regard to the case of interrupts or "cache-miss" phenomena, the asynchronous nature of interrupts enables them to be handled as inexact exceptions by forcing each very long instruction in the pipeline to write back the results before handling the interrupt. Cache misses, instead, produce phenomena that can be likened to bubbles flowing through the pipeline; therefore, whenever a miss signal is raised by the cache control logic, write-back of the results of the instructions is forced in the pipeline.

For a further clarification of the foregoing description it may be noted that, according to one of the elements of major interest of the invention, data sections of interstage registers of the pipeline structure in practice become a further, higher-level, layer in the memory hierarchy.

Hereinafter these registers will be referred to as "microregisters."

Microregisters are visible to the compiler, but not to the programmer.

The optimization rules for their use are particular, and different from those of the elements of the RF.

Microregisters are not write-addressable (or rather, they are implicitly addressed), and the rules for read addressing are architecture-related, in so far as they are more restrictive than for RF elements.

As has been pointed out, the solution according to the invention is essentially based on the forwarding (or bypassing) function so as to avoid writing and reading in the RF in order to reduce power consumption.

Whenever the compiler identifies short-lived variables such as to render the use of forwarding possible, after it has verified that the conditions specified in what follows are satisfied it does not reserve registers in the RF for such variables.

As far as use by the compiler is concerned, the RF space is thus effectively increased, and hence register spilling and the resulting cache traffic are reduced.

Figure 4:
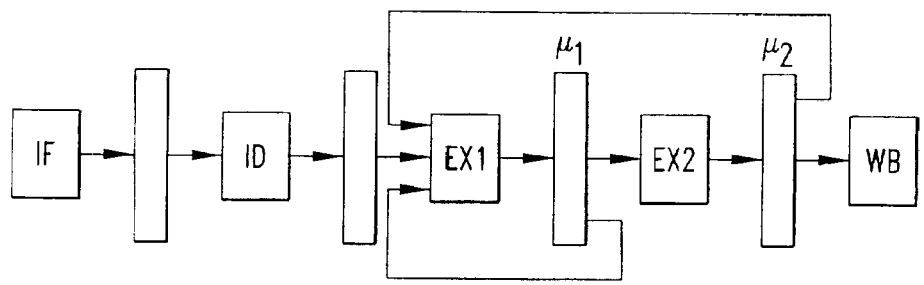
FIGS. 4 and 5 illustrate in still greater detail the modalities of implementation of a solution according to the invention.

Consider in detail the five-stage pipeline structure schematically represented in FIG. 4, which as a whole is similar to the one represented in FIG. 2, with the provision, however, of two stages, EX1 and EX2.

Take as example the following high-level language instruction:

$$x := a*b + c - d$$

which is translated into intermediate code as:

$$t_0 = a*b$$

$$t_1 = c - d$$

$$x = t_0 + t_1.$$

Assume an operation latency of 1 for the subtraction and 2 for the multiplication.

Denoting by $\mu_0$ to the result section in the latch at exit from the EX2 stage and by $\mu_1$ the corresponding section in the latch at exit from the EX1 stage, the above three elementary operations translate into a pseudo-assembler language which exploits the microregisters as follows:

| | |
|---|---|
| mul $\mu_2$, R1, R2 | it is assumed that a, b, c, d are initially stored in the registers R1 to R4 |
| sub $\mu_1$, R3, R4 | |
| add R5, $\mu_1$, $\mu_2$ | the final result is stored in R5 | and the forwarding paths from the latches are exploited as represented in FIG. 4.

For a five-stage pipeline, the maximum allowable distance between writing a variable in a microregister and using the same variable is 3. This creates a constraint for the compiler, which is able to exploit microregisters only in so far as a scheduling within the acceptable distance is possible. Obviously, if deeper pipelines are adopted, greater distances can be used (together with more complex scheduling procedures and further reduction in RF use).

This first example refers to a sequential code. In the case of cycles (loops), microregisters can be exploited across the loop boundaries as well, provided that the constraints outlined above can be satisfied both between the loops (inter-loop) as well as within the loops (intra-loop).

If extension to a simple (pure) VLIW architecture is now considered, the point of interest is represented by the possibility of there being syllables (in parallel in a single very long instruction) characterized by different latencies.

In this case, transfers between microregisters along the pipeline lanes may have to be taken into account.

Figure 5:
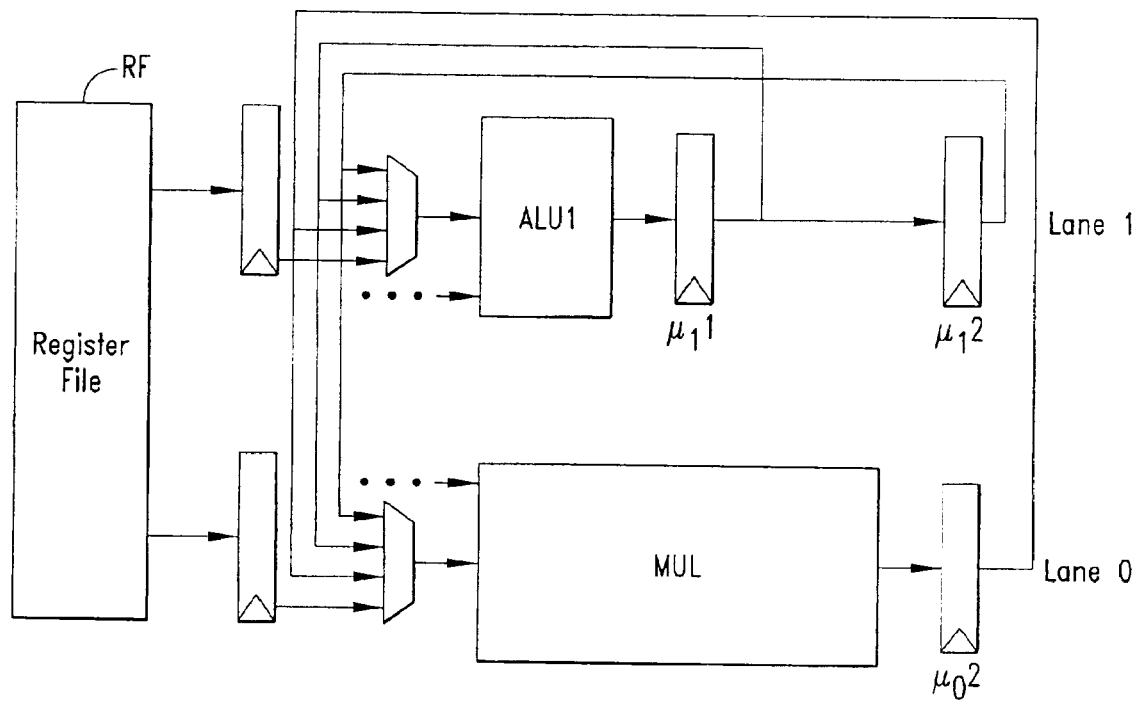

Consider again the same code segment as above, and a two-lane VLIW architecture with one ALU and one multiplier, i.e., a structure corresponding to the one represented in FIG. 5.

Assume moreover that the latencies are the same as above. The code is then scheduled as follows:

i1 mul $\mu_0^2$, R1, R2; sub $\mu_1^1$, R3, R4 the superscript denotes the stage; the subscript denotes the lane i2 nop the contents of $\mu_1^1$ are shifted along the lane to $\mu_1^2$, whilst the final result of the multiplication is stored in $\mu_0^2$ i3 add R5, $\mu_0^2$, $\mu_1^2$.

Furthermore, if the forwarding paths present in the microarchitecture so allow, transfers from microregisters in one lane to functional units in a different lane may be envisaged. In any case, the basic constraints for the compiler are—apart from the ones regarding latency—the following:

the write microregister is always the one in the lane where the functional unit is located; forward transfers along the pipeline are also limited to the same lane;

reading from microregisters is always allowed within the same lane and—in the case of different lanes—as far as forwarding paths make such reading possible.

Microregister use may become a liability in the event of interrupt handling, and, more in general, exception handling.

In fact, the microregisters may be regarded as constituting a "transient" memory such that could not be associated with a machine state to be saved in the case of an exception (except where a solution such as a shadow pipeline is envisaged).

As regards interrupt handling, two possible solutions may be proposed to overcome this problem.

One first solution is based upon the definition of an "atomic sequence," in the sense that the sequence of instructions using the microregisters is viewed as an atomic one and, as such, one that cannot be interrupted. Interrupt is disabled prior to start of the sequence, and the state of the machine is rendered stable (by writing in the RF or in the memory) before the interrupt is re-enabled. This solution does not require any extension of the instruction set or of the microarchitecture and is actually handled by the compiler alone.

Another solution is based upon a principle that may be referred to as "checkpointing."

Two new instructions (actually, pseudo-instructions used by the compiler and affecting only the control unit, but not the pipelines) are introduced, namely, checkpoint declaration (ckp.d) and checkpoint release (ckp.r).

At checkpoint declaration, the program counter (PC) is saved in a shadow register, and until checkpoint release the machine state cannot be modified (obviously, this implies that no storage instructions are allowed). At checkpoint release, the shadow register is reset, and the interrupts are disabled atomically. The results computed in the checkpointed section can be definitively stored (committed) so modifying the real state of the processor, after which the interrupts are enabled again to restart normal execution. In the case of an interrupt between ckp.d and ckp.r, the PC from which execution will restart after interrupt handling is the one saved in the shadow register (and, obviously, in view of the aforementioned constraints imposed on machine-state updating, the machine state is consistent with the PC).

In this connection, two alternative solutions may be proposed.

According to the first solution, all register writes in the sequence between ckp.d and ckp.r involve only microregisters. The compiler verifies whether there is a schedule satisfying the constraints imposed. The RF is involved only to read data.

According to the second solution, a (small) subset of the RF is reserved in a conventional way for "transient" variables between checkpoint declaration and checkpoint release, the liveness of which exceeds the maximum one allowed by the pipeline length. The first appearance of "transient" registers in the checkpointed sequence must be a definition (either a load or a write to a register). These transient registers are not seen as a constituent part of the machine state after checkpoint release (that is, they are considered dead values after this point). It should be noted that, obviously, adoption of these transient registers might imply the risk of register spilling. Quite simply, should register spilling become necessary, use of the microregisters is excluded, and normal compilation using the RF is adopted.

Of course, without prejudice to the principle of the invention, the details of construction and the embodiments may vary widely with respect to what is described and illustrated herein, without thereby departing from the scope of the present invention as defined in the attached claims.

We claim:

1. An architecture for a pipeline processor, comprising:
    a plurality of stages;
    a forwarding network of forwarding paths which connect said stages; and
    a register file for operand write-back, wherein one of said stages includes an optimization-of-power-consumption function via inhibition of writing and subsequent readings in said register file of operands retrievable from said forwarding network because of reduced liveness lengths of said operands, wherein said function is configured for performing selectively, for a register of said register file assigned by a first instruction comprising a write-back stage and used by a second instruction, the following:
    disabling of write-back of said register in said register file in the write-back stage of said first instruction; and
    inhibiting assertion of a read address of said register in said register file by said second instruction.

2. An architecture according to claim 1 wherein said one of said stages includes dedicated logic for disabling the write-enable signals that enable writing in said register file.

3. An architecture according to claim 2 wherein the one of said stages is a decoding stage for decoding the instructions and reading the operands from said register file, and said dedicated logic is included in said decoding stage.

4. An architecture according to claim 1, further comprising dedicated logic which minimizes read-port switching activity in said register file by maintaining values on the input read addresses of the register file at previous clock cycles.

5. An architecture according to claim 1 wherein said processor is a superscalar processor comprising a hardware control unit capable of analyzing an instruction window to determine liveness lengths of registers of the register file.

6. An architecture according to claim 1 wherein said architecture is configured as a VLIW architecture, in which a decision of activating said function is delegated to a compiler.

7. An architecture according to claim 6 wherein the compiler transfers information to hardware control logic, reserving specific operation bits in instruction encoding.

8. An architecture according to claim 6 wherein the compiler transfers information to hardware control logic, exploiting unused instruction encoding bits.

9. An architecture according to claim 1, further comprising interstage registers comprised between the stages for storing a volatile architectural state, and wherein the architecture is configured for discarding elements that exit said volatile architectural state, avoiding write-back in said register file.

10. An architecture according to claim 9 wherein the architecture is adapted to operate on instructions configurable as exceptions, and, in order to ensure re-execution of instructions constituting an exception in a correct processor state, to write-back values inhibited as regards writing in said register file in the presence of a signal that is configured as an exception.

11. An architecture according to claim 10 wherein the plurality of stages includes a decoding stage for decoding instructions and reading operands from said register file, an instruction-execution stage, and a memory-access stage, and said write-back occurs whenever an exception signal is generated in one of said stages.

12. An architecture according to claim 10 wherein, in the presence of an instruction configured as an exception, the architecture is configured for executing the instructions in the pipeline until their completion, the results of all the instructions in the pipeline being written back in said register file.

13. An architecture according to claim 1, further comprising interstage registers coupled between stages of the plurality of stages, including latch registers used as a memory layer for storing the operands.

14. An architecture according to claim 13 wherein said interstage registers are configured in such a way that they are visible to the compiler and are not visible to the programmer.

15. An architecture according to claim 13 wherein said interstage registers are not write-addressable, in so far as they are implicitly addressed.

16. An architecture according to claim 13 wherein said interstage registers are configured as a transient memory which cannot be associated to a machine state that can be saved in the event of an exception.

17. An architecture according to claim 16 wherein said architecture is configured in such a way that sequences of instructions that use said interstage registers are treated as atomic sequences that are not subject to interrupts.

18. An architecture according to claim 17 wherein any interrupt is disabled prior to start of said sequences, and a machine state is rendered stable prior to interrupt re-enabling by means of write-back in the register file or in the memory.

19. An architecture according to claim 16, further comprising a function of generation of two pseudo-instructions, one for checkpoint declaration and one for checkpoint release, with the provision of a shadow register, wherein a program counter is saved from an instant of checkpoint declaration, a machine state not being modifiable until checkpoint release, whereby, upon checkpoint release, the shadow register is reset and the interrupts are disabled atomically.

20. An architecture according to claim 19 wherein results computed between said two pseudo-instructions are entrusted to a real state of the processor with subsequent interrupt re-enabling to enable re-start of normal execution.

21. An architecture according to claim 19 wherein, in the presence of interrupts between said pseudo-instructions, the execution is made to restart, after handling of the interrupts, starting from the program counter stored in the shadow register.

22. An architecture according to claim 19 wherein all register writings comprised between said pseudo-instructions involve only said interstage registers, whereby said register file is involved only for data reading.

23. An architecture according to claim 19 wherein the register file includes a subset reserved for transient variables that are generated between said two pseudo-instructions and a liveness length of which exceeds a maximum value allowed by the pipeline.

24. An architecture according to claim 23 wherein the first appearance of transient registers in a sequence being checkpointed is a definition such as a load or write in a register, which can be seen as a constituent part of the machine state after checkpoint release.

25. An architecture for a pipeline processor, comprising:
a plurality of stages;
a forwarding network of forwarding paths which connect said stages; and
a register file for operand write-back, wherein one of said stages includes an optimization-of-power-consumption function via inhibition of writing and subsequent readings in said register file of operands retrievable from said forwarding network because of reduced liveness lengths of said operands, wherein said one of said stages includes dedicated logic for disabling the write-enable signals that enable writing in said register file, wherein the one of said stages is a decoding stage for decoding the instructions and reading the operands from said register file, and said dedicated logic is included in said decoding stage.

26. An architecture according to claim 25, further comprising dedicated logic which minimizes read-port switching activity in said register file by maintaining values on the input read addresses of the register file at previous clock cycles.

27. An architecture according to claim 25 wherein said processor is a superscalar processor comprising a hardware control unit capable of analyzing an instruction window to determine liveness lengths of registers of the register file.

28. An architecture according to claim 25 wherein said architecture is configured as a VLIW architecture, in which a decision of activating said function is delegated to a compiler.

29. An architecture according to claim 28 wherein the compiler transfers information to hardware control logic, reserving specific operation bits in instruction encoding.

30. An architecture according to claim 28 wherein the compiler transfers information to hardware control logic, exploiting unused instruction encoding bits.

31. An architecture according to claim 25, further comprising interstage registers comprised between the stages for storing a volatile architectural state, and wherein the architecture is configured for discarding elements that exit said volatile architectural state, avoiding write-back in said register file.

32. An architecture for a pipeline processor, comprising:
a plurality of stages;
a forwarding network of forwarding paths which connect said stages;
a register file for operand write-back, wherein one of said stages includes an optimization-of-power-consumption function via inhibition of writing and subsequent readings in said register file of operands retrievable from said forwarding network because of reduced liveness lengths of said operands; and
dedicated logic which minimizes read-port switching activity in said register file by maintaining values on the input read addresses of the register file at previous clock cycles.

33. An architecture according to claim 32 wherein said processor is a superscalar processor comprising a hardware control unit capable of analyzing an instruction window to determine liveness lengths of registers of the register file.

34. An architecture according to claim 32 wherein said architecture is configured as a VLIW architecture, in which a decision of activating said function is delegated to a compiler.

35. An architecture according to claim 34 wherein the compiler transfers information to hardware control logic, reserving specific operation bits in instruction encoding.

36. An architecture according to claim 34 wherein the compiler transfers information to hardware control logic, exploiting unused instruction encoding bits.

37. An architecture according to claim 32, further comprising interstage registers comprised between the stages for storing a volatile architectural state, and wherein the architecture is configured for discarding elements that exit said volatile architectural state, avoiding write-back in said register file.

38. An architecture for a pipeline processor, comprising:
a plurality of stages;
a forwarding network of forwarding paths which connect said stages;
a register file for operand write-back, wherein one of said stages includes an optimization-of-power-consumption function via inhibition of writing and subsequent readings in said register file of operands retrievable from said forwarding network because of reduced liveness lengths of said operands; and
interstage registers coupled between stages of the plurality of stages, including latch registers used as a memory layer for storing the operands, wherein said interstage registers are not write-addressable, in so far as they are implicitly addressed.

39. An architecture according to claim 38, wherein said interstage registers store a volatile architectural state, and wherein the architecture is configured for discarding elements that exit said volatile architectural state, avoiding write-back in said register file.

40. An architecture according to claim 39 wherein the architecture is adapted to operate on instructions configurable as exceptions, and, in order to ensure re-execution of instructions constituting an exception in a correct processor state, to write-back values inhibited as regards writing in said register file in the presence of a signal that is configured as an exception.

41. An architecture according to claim 40 wherein the plurality of stages includes a decoding stage for decoding instructions and reading operands from said register file, an instruction-execution stage, and a memory-access stage, and said write-back occurs whenever an exception signal is generated in one of said stages.

42. An architecture according to claim 40 wherein, in the presence of an instruction configured as an exception, the architecture is configured for executing the instructions in the pipeline until their completion, the results of all the instructions in the pipeline being written back in said register file.

43. An architecture according to claim 38 wherein said interstage registers are configured as a transient memory which cannot be associated with a machine state that can be saved in the event of an exception.

44. An architecture according to claim 43 wherein said architecture is configured in such a way that sequences of instructions that use said interstage registers are treated as atomic sequences that are not subject to interrupts.

45. An architecture according to claim 44 wherein any interrupt is disabled prior to start of said sequences, and a machine state is rendered stable prior to interrupt re-enabling by means of write-back in the register file or in the memory.

46. An architecture for a pipeline processor, comprising:
a plurality of stages;
a forwarding network of forwarding paths which connect said stages;
a register file for operand write-back, wherein one of said stages includes an optimization-of-power-consumption function via inhibition of writing and subsequent readings in said register file of operands retrievable from said forwarding network because of reduced liveness lengths of said operands; and
interstage registers coupled between stages of the plurality of stages, including latch registers used as a memory layer for storing the operands, wherein said interstage registers are configured as a transient memory which cannot be associated to a machine state that can be saved in the event of an exception, wherein said architecture is configured in such a way that sequences of instructions that use said interstage registers are treated as atomic sequences that are not subject to interrupts.

47. An architecture according to claim 46, wherein the interstage registers store a volatile architectural state, and wherein the architecture is configured for discarding elements that exit said volatile architectural state, avoiding write-back in said register file.

48. An architecture according to claim 47 wherein the architecture is adapted to operate on instructions configurable as exceptions, and, in order to ensure re-execution of instructions constituting an exception in a correct processor state, to write-back values inhibited as regards writing in said register file in the presence of a signal that is configured as an exception.

49. An architecture according to claim 48 wherein the plurality of stages includes a decoding stage for decoding instructions and reading operands from said register file, an instruction-execution stage, and a memory-access stage, and said write-back occurs whenever an exception signal is generated in one of said stages.

50. An architecture according to claim 48 wherein, in the presence of an instruction configured as an exception, the architecture is configured for executing the instructions in the pipeline until their completion, the results of all the instructions in the pipeline being written back in said register file.

51. An architecture according to claim 46 wherein said interstage registers are configured in such a way that they are visible to the compiler and are not visible to the programmer.

52. An architecture according to claim 46 wherein any interrupt is disabled prior to start of said sequences, and a machine state is rendered stable prior to interrupt re-enabling by means of write-back in the register tile or in the memory.

53. An architecture for a pipeline processor, comprising:
a plurality of stages;
a forwarding network of forwarding paths which connect said stages;
a register file for operand write-back, wherein one of said stages includes an optimization-of-power-consumption function via inhibition of writing and subsequent readings in said register file of operands retrievable from said forwarding network because of reduced liveness lengths of said operands wherein said processor is a superscalar processor comprising a hardware control unit capable of analyzing an instruction window to determine liveness lengths of registers of the register file;
interstage registers coupled between stages of the plurality of stages, including latch registers used as a memory layer for storing the operands, wherein said interstage registers are configured as a transient memory which cannot be associated to a machine state that can be saved in the event of an exception; and
a function of generation of two pseudo-instructions, one for checkpoint declaration and one for checkpoint release, with the provision of a shadow register, wherein a program counter is saved from an instant of checkpoint declaration, a machine state not being modifiable until checkpoint release, whereby, upon checkpoint release, the shadow register is reset and the interrupts are disabled atomically.

54. An architecture according to claim 53 wherein results computed between said two pseudo-instructions are entrusted to a real state of the processor with subsequent interrupt re-enabling to enable re-start of normal execution.

55. An architecture according to claim 53 wherein, in the presence of interrupts between said pseudo-instructions, the execution is made to restart, after handling of the interrupts, starting from the program counter stored in the shadow register.

56. An architecture according to claim 53 wherein all register writings comprised between said pseudo-instructions involve only said interstage registers, whereby said register file is involved only for data reading.

57. An architecture according to claim 53 wherein the register file includes a subset reserved for transient variables that are generated between said two pseudo-instructions and a liveness length of which exceeds a maximum value allowed by the pipeline.

58. An architecture according to claim 57 wherein the first appearance of transient registers in a sequence being checkpointed is a definition such as a load or write in a register, which can be seen as a constituent part of the machine state after checkpoint release.

* * * * *